Feb. 3, 1942.   H. T. SEELEY   2,271,992
REMOTE CONTROL SYSTEM
Filed Jan. 13, 1941
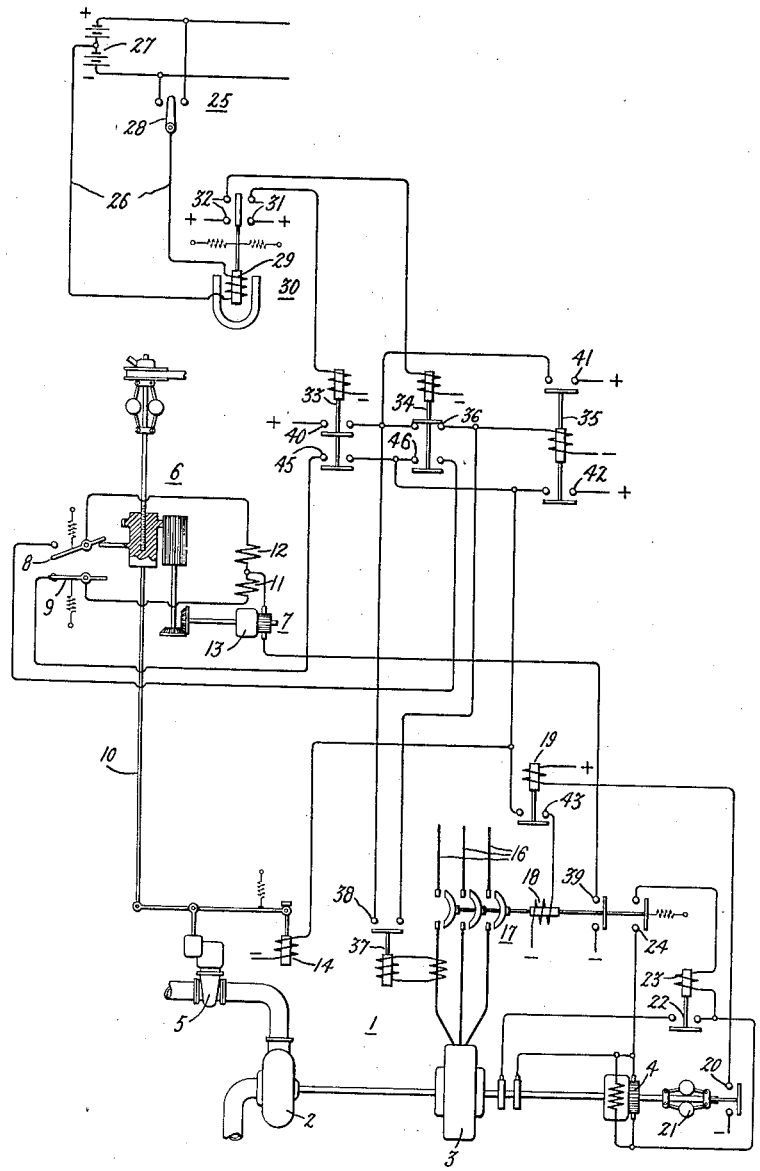
Inventor:
Harold T. Seeley,
by Harry E. Dunham
His Attorney.

Patented Feb. 3, 1942

2,271,992

UNITED STATES PATENT OFFICE 2,271,992

REMOTE CONTROL SYSTEM

Harold T. Seeley, Lansdowne, Pa., assignor to General Electric Company, a corporation of New York Application January 13, 1941, Serial No. 374,153

17 Claims. (Cl. 290—4)

My invention relates to remote control systems and particularly to systems for controlling the starting, a predetermined operating condition, such as the output, and the shutting down of an automatic electric station from a remote station.

Heretofore when the remote control of an automatic electric station has been effected directly over line wires interconnecting the two stations, it has been the usual practice to provide one control circuit for effecting the starting and shutting down of the automatic station and another control circuit for regulating the predetermined operating condition of the automatic station after it has been placed in service. When the remote control has been effected over a single pair of line wires by means of a supervisory control equipment of any of the well known types, it has been the practice to effect the starting and shutting down of the automatic station in one position of the supervisory control equipment and to effect the desired regulation, after the station has been put in service, in another position of the supervisory control equipment.

One object of my invention is to provide an improved arrangement of apparatus whereby only a single control circuit or a single position of a supervisory control equipment is needed to effect the starting and stopping of an automatically controlled station and also the desired regulation of the station while it is in operation.

My invention will be better understood from the following description when taken in connection with the accompanying drawing, the single figure of which diagrammatically illustrates a remote control arrangement for an automatic prime mover dynamo-electric plant embodying my invention, and the scope of my invention will be pointed out in the appended claims.

Referring to the drawing, I represents an automatic prime mover dynamo-electric plant including a water wheel 2 driving a synchronous generator 3 and a direct current exciter 4. The supply of water to the water wheel 2 is controlled by a gate 5 which in turn is controlled by suitable governing means 6 which, in the particular arrangement shown in the drawing, is a flyball governor that responds in any well known manner to the speed of the water wheel 2. The governing means 6 as shown is provided with a reversible motor 7 which is arranged in any suitable manner, examples of which are well known in the art whereby, by rotating the motor 7 in one direction, the setting of the governor is varied so that the output of the plant is increased and whereby, by rotating the motor in the opposite direction, the setting of the governor is varied so that the output of the plant is decreased. As shown, the rotation of the motor 7 varies, within limits determined by the limit switches 8 and 9, the length of the operating rod 10 of the governor. The motor 7 is provided with the field windings 11 and 12 which are so connected to the motor armature winding 13 that, when a circuit is completed through the field winding 11 and the motor armature winding 13 in series, the motor 7 operates in a direction to increase the output of the plant, and when a circuit is completed through the field winding 12 and the motor armature winding 13, the motor 7 operates in a direction to decrease the output of the plant. The governor 6 is also provided with a starting solenoid 14 which is energized when it is desired to start the water wheel 2 and which is deenergized when it is desired to shut down the plant.

The generator 3 is arranged to be connected to an electric system 16 by a circuit breaker 17 having an operating winding 18 which, when energized, maintains the circuit breaker 17 closed. The circuit of the operating winding 18 is controlled by a control relay 19 the circuit of which is controlled by the contacts 20 of a suitable speed responsive device 21 driven by the water wheel 2. The speed responsive device 21 is designed so that its contacts 20 are closed to complete the circuit of the control relay 19 whenever the speed of the generator 3 is above a predetermined value.

The field winding of the generator 3 is arranged to be connected across the brushes of the direct current exciter 4 by a field switch 22, the operating winding 23 of which is connected across the brushes of the exciter 4 by the auxiliary contacts 24 of the circuit breaker 17 when it is closed.

In the particular embodiment of my invention shown, the automatic electric plant I is arranged to be controlled from a remote control station 25 over a single pair of line wires 26, one of which is permanently connected to the midpoint of a battery 27 and the other of which is arranged to be connected by a suitable control switch 28 to either the positive or the negative terminal of the battery 27. At the automatic plant I the winding 29 of a polarized relay 30 is connected in series with the line wires 26. When no current flows through the line wires 26, the armature of the polarized relay 30 is in the position in which it is shown, but when the control switch 28 is operated so as to establish a connection between the positive terminal of the battery 27 and the winding 29, the relay 30 closes its contacts 31, whereas when the control switch 28 is operated so as to establish a connection to the negative terminal of the battery 27, the relay 30 closes its contacts 32. The closing of the contacts 31 and 32 respectively completes energizing circuits for the control relays 33 and 34. The relay 33, when energized, completes an energizing circuit for a master relay 35 which in turn controls the control circuits at the automatic plant 1 so that, when the relay 35 is energized, it effects the starting up of the plant, and when it is deenergized, it effects the shutting down of the plant. The relay 34, when energized, interrupts its contacts 36 which are in the energizing circuit of the master relay 35. However, suitable load indicating means, such as a well known gate limit switch or a generator current relay having its contacts connected in parallel with the contacts 36, are provided to prevent the master relay 35 from being deenergized as long as the load supplied by the plant 1 is above a predetermined value. A generator current relay 37 is the particular means shown in the drawing for accomplishing this result.

In accordance with my invention, I also arrange the circuits at the automatic plant 1 so that the regulating motor 7 of the governing means 6 can be controlled over the line wires 26 after the plant has been started and placed in service. This is accomplished by arranging the circuits of the motor 7 so that they can be controlled by operating the relays 33 and 34 after the circuit breaker 17 has been closed and its auxiliary contacts 39, which are in series with the motor armature winding 13, are closed.

The operation of the arrangement shown in the drawing is as follows:

When the plant 1 is shut down, the various control devices are in the positions in which they are shown in the drawing. When it is desired to start the plant 1, the control switch 28 at the remote station 25 is operated so that the line wires 26 are connected between the positive and mid-terminals of the battery 27. This connection causes the current to flow through the line wires 26 in the proper direction to operate the relay 30 so that it closes its contacts 31 and completes an energizing circuit for the control relay 33. The closing of the contacts 40 of the relay 33 completes through the contacts 36 of the control relay 34 an energizing circuit for the master relay 35. By closing its contacts 41, the master relay 35 completes a locking circuit for itself, and by closing its contacts 42, the master relay 35 completes an energizing circuit for the stating magnet 14 of the governor 6 so that the governor effects the opening of the gate 5 in a manner well known in the art.

When the water wheel speed reaches a predetermined value in response to the opening of the gate 5, the speed responsive means 21 closes its contacts 20 and completes an energizing circuit for the control relay 19. The closing of the contacts 43 of the relay 19 completes through contacts 42 of the master relay 35 an energizing circuit for the operating winding 18 of the circuit breaker 17 so that the armature winding of the generator 3 is connected to the electric system 16. As soon as the voltage of the exciter 4 is above a predetermined value after the circuit breaker 17 has closed its contacts 24, the operating winding 23 of the field switch 22 is sufficiently energized to close the field switch 22 so as to connect the field winding of the generator 3 across the brushes of the exciter 4. The generator 3 now operates as a synchronous generator supplying current to the electric system 16. As soon as the current output of the generator exceeds a predetermined value, the generator current relay 37 closes its contacts 38 and completes a shunt circuit around the contacts 36 of relay 34 in the holding circuit of the master relay 35. Since the master relay 35 completes a holding circuit for itself as soon as it is energized, the control switch 28 has to be closed only momentarily in order to effect the starting of the automatic electric plant 1.

After the plant 1 has been started, the output thereof may be varied to any desired value, within predetermined limits, by operating the motor 7 so as to vary the length of the governor rod 10. When it is desired to increase the output of the plant 1, the control switch 28 is operated so as to connect the winding 29 of the polarized relay 30 across the positive and mid terminals of the battery 27 thereby causing the relay 30 to close its contacts 31 and complete an energizing circuit for the control relay 33. The closing of the contacts 45 of the relay 33 completes a circuit through the contacts 42 of the master relay 35, limit switch 9, field winding 11, armature winding 13 and contacts 39 of the circuit breaker 17. This circuit causes the motor 7 to operate in the proper direction to change the length of the governor rod 10 so as to increase the opening of the gate 5. The motor 7 will continue to operate in this direction as long as the winding 29 of the relay 30 is connected across the positive and mid terminals of the battery 27 by the control switch 28.

In case it is desired to decrease the output of the plant 1, the control switch 28 at the remote station is operated so that the winding 29 of the polarized relay 30 is connected across the mid and negative terminals of the battery 27. The current through the winding 29 is then in a direction to cause the relay 30 to close its contacts 32 and complete an energizing circuit for the control relay 34. As long as the current output of the generator 3 is above a predetermined value so that the contacts 38 of the relay 37 are closed, the opening of the contacts 36 of the relay 34, when it is energized, does not effect the deenergization of the master relay 35. The closing of the contacts 46 of the control relay 34 completes a circuit through the contacts 42 of the master relay 35, the limit switch 8, field winding 12, armature winding 13 and the contacts 39 of the circuit breaker 17. This energizing circuit for the motor 7 causes it to operate in the proper direction to vary the length of the governor rod 10 so as to decrease the opening of the gate 5.

When it is desired to shut the plant down, the control switch 28 is operated so as to decrease the output of the generator below the drop-out value of the current relay 37. When this relay 37 opens its contacts 38 and the control relay 34 is energized, the holding circuit of the master relay 35 is interrupted. By opening its contacts 42, the master relay 35 interrupts the energizing circuits for the governor starting magnet 14 and the closing coil 18 of the circuit breaker 17 so that the generator 3 is disconnected from the system 16 and the governor 6 operates to close the gate 5 thereby shutting off the supply of water to the water wheel 2.

While in the particular embodiment of my invention, shown in the drawing, I have shown the operating winding 29 of the relay 30 permanently connected to the two control conductors 26, it is obvious that the winding 29 normally may be disconnected therefrom and may be connected thereto by any suitable type of automatic supervisory control equipment after which the current through the control conductors 26 may be varied in the manner heretofore described to effect the starting, control and shutting down of the plant I.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an automatic electric station including starting and regulating means therefor, a remote station, a control circuit interconnecting said stations, means for causing current of a predetermined character to flow through said circuit, and means controlled by said current and a predetermined operating condition of said automatic station for effecting the operation of said starting means in response to the flow of said current in said circuit prior to the occurrence of said predetermined operating condition and for effecting the operation of said regulating means in response to the flow of said current in said circuit only after the occurrence of said predetermined operating condition.

2. In combination, an automatic electric station including starting and load regulating means therefor, a remote station, a control circuit interconnecting said stations, means for causing current of a predetermined character to flow through said circuit, and means controlled by said current and a predetermined operating condition of said automatic station for effecting the operation of said starting means in response to the flow of said current in said circuit prior to the occurrence of said predetermined operating condition and for effecting the operation of said regulating means to increase the load on said automatic station in response to the flow of said current in said circuit only after the occurrence of said predetermined operating condition.

3. In combination, an automatic electric station including means for starting and shutting down said station and means for regulating a predetermined electric condition of said station while it is in operation, a remote station, a control circuit interconnecting said stations, means for causing currents of different predetermined character to flow through said circuit, means controlled by current of one predetermined character in said circuit for effecting the operation of said starting means prior to the occurrence of a predetermined operating condition of said automatic station and the operation of said regulating means in one predetermined manner only after the occurrence of said predetermined operating condition, and means controlled by current of a different character in said circuit for effecting the operation of said regulating means in a different predetermined manner if said automatic station is in a predetermined operating condition and the operation of said shutting down means if said automatic station is not in said last-mentioned operating condition.

4. In combination, an automatic electric station including means for starting and shutting down said station and means for regulating a predetermined electric condition of said station while it is in operation, a remote station, a control circuit interconnecting said stations, means for causing currents of different predetermined character to flow through said circuit, means controlled by current of one predetermined character in said circuit for effecting the operation of said starting means prior to the occurrence of a predetermined operating condition of said automatic station and the operation of said regulating means to increase the load on said automatic station only after the occurrence of said predetermined operating condition, and means controlled by current of a different character in said circuit for effecting the operation of said regulating means to decrease the load on said automatic station if said load is above a predetermined value and for effecting the operation of said stopping means if said load is below said predetermined value.

5. In combination, an automatic electric station including means for regulating a predetermined electric condition of said station and means for shutting down said station, a remote station, a control circuit interconnecting said stations, means for causing current of a predetermined character to flow through said circuit, and means controlled by said current for effecting the operation of said regulating means if said automatic station is in a predetermined operating condition and the operation of said shutting down means if said automatic station is not in said predetermined operating condition.

6. In combination, an automatic electric station including means for regulating a predetermined electric condition of said station and means for shutting down said station, a remote station, a control circuit interconnecting said stations, means for causing current of a predetermined character to flow through said circuit, and means controlled by said current for effecting the operation of said regulating means to decrease the load on said automatic station if said load is above a predetermined value and the operation of said shutting down means if said load is below said predetermined value.

7. In combination, an automatic electric station, a remote station, contacts at said automatic station, means at said remote station for effecting a predetermined operation of said contacts, and means responsive to said predetermined operation of said contacts for effecting different predetermined operations of said automatic station dependent upon the operating condition of said automatic station when said predetermined operation of said contacts is effected.

8. In combination, an automatic electric station, a remote station, contacts at said automatic station, means at said remote station for effecting a predetermined operation of said contacts, and means responsive to said predetermined operation of said contacts for effecting the starting of said automatic station if it is not in operation when said predetermined operation of said contacts is effected and for varying the load on said automatic station if it is in operation when said predetermined operation of said contacts is effected.

9. In combination, an automatic electric station, a remote station, contacts at said automatic station, means at said remote station for effecting a predetermined operation of said contacts, and means responsive to said predetermined operation of said contacts for effecting a decrease in the load on said automatic station if it is in operation and the load is above a predetermined value and for effecting the shutting down of said automatic station if it is in operation and the load on it is below said predetermined value.

10. In combination, an automatic station including a dynamo-electric machine and an electric circuit and switching means for connecting said machine to said circuit, a remote station, contacts at said automatic station, means at said remote station for effecting a predetermined operation of said contacts, and means responsive to said predetermined operation of said contacts for effecting the operation of said switching means if said dynamo-electric machine is disconnected from said circuit when said predetermined operation of said contacts is effected and for varying the current flowing between said machine and said circuit if they are connected together by said switching means when said predetermined operation of said contacts is effected.

11. In combination, an automatic station including a dynamo-electric machine and an electric circuit and switching means for connecting said machine to said circuit, a remote station, contacts at said automatic station, means at said remote station for effecting a predetermined operation of said contacts, and means responsive to said predetermined operation of said contacts for effecting the operation of said switching means if said dynamo-electric machine is disconnected from said circuit when said predetermined operation of said contacts is effected and for increasing the load on said machine if said machine is connected to said circuit when said predetermined operation of said contacts is effected.

12. In combination, an automatic station including a dynamo-electric machine and an electric circuit and switching means for connecting said machine to said circuit, a remote station, contacts at said automatic station, means at said remote station for effecting a predetermined operation of said contacts, and means responsive to said predetermined operation of said contacts for effecting a decrease in the load on said machine if said machine is connected to said circuit and the load on said machine is above a predetermined value and for effecting the operation of said switching means to disconnect said machine from said circuit if the load on said machine is below a predetermined value.

13. In combination, an automatic station including a dynamo-electric machine and an electric circuit and switching means for connecting said machine to said circuit, a remote station, contacts at said automatic station, means at said remote station for effecting a predetermined operation of said contacts, and means responsive to said predetermined operation of said contacts for effecting a decrease in the load on said machine if said machine is connected to said circuit and the current flowing between said machine and circuit is above a predetermined value and for effecting the operation of said switching means to disconnect said machine from said circuit if said current is below a predetermined value.

14. In combination, a prime mover dynamo-electric plant including a prime mover driving a dynamo-electric generator, an electric circuit, a circuit breaker for connecting said generator to said circuit, a remote station, contacts at said plant, means at said remote station for effecting a predetermined operation of said contacts, and means responsive to said predetermined operation of said contacts when said circuit breaker is open for effecting the operation of said prime mover and the subsequent closing of said circuit breaker and for controlling said prime mover to increase the load carried by said plant when said predetermined operation of said contacts is effected after said circuit breaker is closed.

15. In combination, a prime mover dynamo-electric plant including a prime mover driving a dynamo-electric generator, an electric circuit, a circuit breaker for connecting said generator to said circuit, a remote station, contacts at said plant, means at said remote station for effecting a predetermined operation of said contacts, and means responsive to said predetermined operation of said contacts for controlling said prime mover to decrease the load on said plant if the load on said plant is above a predetermined value and for effecting the shutting down of said prime mover and the opening of said circuit breaker if the load on said plant is below said predetermined value.

16. In a remote controlled electric station, means for effecting a predetermined control operation, and means responsive to said control operation for starting the station if it is shut down when said predetermined control operation is effected and for increasing the output of said station only when said predetermined control operation is effected after it has been started.

17. In a remote controlled electric station, means for effecting a predetermined control operation, and means responsive to said control operation for decreasing the output of said station if the load on said station exceeds a predetermined amount and for shutting down said station if the load is below said predetermined value when said control operation is effected.

HAROLD T. SEELEY.